Patented July 19, 1932

1,868,364

UNITED STATES PATENT OFFICE

EUGENE L. PARKER, OF MOUNT PLEASANT, TENNESSEE

PROCESS FOR DETERMINING THE QUANTITY OF POTASSIUM IN FERTILIZERS

No Drawing.   Application filed March 26, 1931.   Serial No. 525,624.

This invention relates to a process for determining the quantity of potassium in fertilizers. It has been proposed to employ a process for determining the quantity of potash salts in mixed fertilizers and materials in which aluminum, calcium, iron and lead oxides are formed but which as is usual being converted into hydroxides they are not eliminated in the final product so that approximately 90% only of the potash is recovered, thereby giving an incorrect estimation of the potassium in the fertilizer.

It is an object of the invention to provide a process for the exact determination of the potassium found in mixed fertilizer materials and in which the calcium, iron, aluminum and lead salts are precipitated or removed from the solutions containing the potassium salt.

A further object of the invention is the provision of a process for determining a quantity of potassium in a given sample of a mixed fertilizer by forming hydroxides of the aluminum, calcium, iron and lead salts found in the fertilizer and then re-acting a sulphide with the solution containing hydroxides so that when a soluble oxalate is applied to the solution, the sulphides of aluminum, iron, lead and calcium will be precipitated and removed from the solution which is evaporated to approximate dryness and then treated with sulphuric acid and further evaporated to dryness to obtain potassium sulphate. This sulphate is maintained at a red heat until the sulphate becomes white after which it is dissolved in water and to this solution is added a few drops of hydrochloric acid together with platinic chloride in excess, the resultant product being potassium platinic chloride from which it is possible to determine readily the quantity of potassium contained originally in the sample of the fertilizer.

The invention will be best understood from a consideration of the following detailed description; nevertheless it is to be understood that the invention is not confined to the disclosure, being susceptible of such changes and modifications which shall define no material departure from the salient features of the invention as expressed in the appended claims.

In carrying out my invention it is essential to carefully prepare certain re-agents, such as ammonium chloride and platinum chloride.

The ammonium chloride is prepared by dissolving 100 grams of ammonium chloride in 500 cubic centimeters of water to which is added from 5 to 10 grams of pulverized potassium-platinic chloride. This solution is agitated at intervals from 6 to 8 hours. It is then allowed to settle over night after which it is filtered. The residue obtained may be used for the preparation of a fresh supply. The solution itself is approximately a 20% solution of ammonium chloride and a saturated solution of potassium platinic chloride. Such a solution will not dissolve any more potassium platinic chloride but will dissolve water soluble, sodium and magnesium salts.

A platinum solution is made by dissolving $2\frac{1}{10}$th grams of platinic chloride in 10 cubic centimeters measures of water. The platinic chloride is obtained by dissolving metallic platinum in aqua regia consisting of 82 parts of hydro-chloric acid and 18 parts of nitric acid. The resultant product which is platinic chloride is evaporated to dryness and then dissolved in hydrochloric acid and then evaporated to dryness to eliminate any nitrates that may be present.

A third re-agent which is an important feature of the present process is either ammonium sulphide or hydrogen sulphide. The ammonium sulphide is produced by saturating 500 cubic centimeters of ammonium hydroxide having a specific gravity of 0.945, with hydrogen sulphide. The hydrogen sulphide gas is passed through the solution of ammonium hydroxide.

It is necessary to specially prepare the mixed fertilizers before applying re-agents. In order to accomplish the proper results 10 grams of the finely ground sample of the mixed fertilizer is boiled 30 minutes in 300 centimeters of water. To the hot solution is added a slight excess of ammonium hydroxide after which 15 cubic centimeters of the ammonium sulphide solution described above is thoroughly shaken with the solution of the fertilizer, or hydrogen sulphide gas may be passed through the alkaline solution until saturation takes place and all of the soluble salts of aluminum, iron and lead will be precipitated as sulphides. Powdered ammonium oxalate is added to the solution which will precipitate all of the lime present as calcium oxalate and since the sulphides of aluminum, iron and lead are insoluble in the ammonium oxalate solution, the sulphides will be precipitated. This solution containing the precipitate is allowed to cool and diluted to 500 cubic centimeters with water, mixed thoroughly after which it is passed through a dry filter to remove the calcium oxalate and sulphides.

When it is desired to determine the total amount of potassium in organic substances, such as cottonseed meal, tobacco stems, etc., I saturate 10 grams of the substance with strong sulphuric acid and ignite the same in a muffle furnace at low red heat to destroy organic matter. The potash salts left in the residue are converted into sulphate which is not volatile. A small quantity of strong hydro-chloric acid is added and this product is warmed slightly in order to loosen the mass from the dish or crucible, after which the mass is transferred to a flask approximately 500 cubic centimeters. Water is added to the mass and the same is boiled for 30 minutes. This solution is made alkaline by addition of sufficient ammonium hydroxide. 15 cubic centimeters of ammonium sulphide solution is added to the solution of the flask or the solution is saturated with hydrogen sulphide and when the solution is thoroughly shaken the ammonium sulphide or the hydrogen sulphide will precipitate all of the soluble salts of aluminum, iron, and lead as sulphides from the alkaline solution. Powdered ammonium oxalate is added in sufficient quantities to precipitate all of the lime present. The sulphides being insoluble in the oxalate solution will remain as a precipitate. This solution is cooled and then diluted with water so that the solution will be approximately 500 cubic centimeters which is mixed thoroughly then passed through a dry filter.

50 cubic centimeters of the solution thus obtained is evaporated to approximate dryness to form a powder to which is added one cubic centimeter of diluted sulphuric acid (one part of sulphuric acid to one part of water). This is evaporated to dryness and ignited until the product becomes white. The product thus obtained is potassium sulphate which being non-volatile may be maintained at a full red heat until the residue is perfectly white. The residue is dissolved in hot water using at least 20 cubic centimeters, to 1.85 decigrams of potassium sulphate. A few drops of hydrochloric acid and the platinic chloride solution noted above is added in excess. The product thus obtained is evaporated on a water bath until a thick paste is obtained which is treated with 80% alcohol, specific gravity 0.8645. At this time care must be exercised to avoid the absorption of ammonia. The product is washed thoroughly with 80% alcohol both by decantation and on the filter. The washing is continued after the filtrate is colorless. The filtrate then is washed with 10 cubic centimeters of the ammonium chloride solution noted above to remove impurities, such as water soluble sodium and magnesium salts from the precipitate. The washing is continued five or six times after which it is thoroughly washed with 80% alcohol and dried for 30 minutes at approximately 100° centigrade. The product obtained will be potassium platinic chloride.

I claim:

1. The process of determining the quantity of potassium in fertilizers which comprises boiling 10 grams of a sample of fertilizer in 300 cubic centimeters of water, reacting ammonium hydroxide with the hot solution to form iron, aluminum and lead hydroxide of such elements in the sample, converting such hydroxides into sulphides, adding ammonium oxalate to cause precipitation of the sulphides and any lime present, filtering said solution to remove the precipitate, evaporating 50 cubic centimeters of the filtered solution to approximate dryness, adding one cubic centimeter of dilute sulphuric acid to the evaporate to form potassium sulphate, heating said sulphate until the same becomes white in color, dissolving the sulphate in hot water, then adding a few drops of hydrochloric acid and a solution of platinic chloride in excess to form potassium platinic chloride, lixiviating with water and alcohol.

2. The process of determining the quantity of potassium in fertilizers which comprises boiling a sample of the fertilizer in water, re-acting ammonium hydroxide with the hot solution for converting iron, aluminum and lead salts found in the fertilizer into their respective hydroxides, reacting a sulphide with the solution for converting the hydroxides of the elements into sulphides, precipitating the sulphides with ammonium oxalate, removing the precipitate, evaporating the filtered solution to approximately a dry powder, re-acting the dry powder with a dilute solution of sulphuric acid to form potassium sulphate, heating the sulphate and adding hydrochloric acid and a solution of platinic chloride in excess, then lixiviating the product with water and alcohol.

3. A method of removing calcium, lead, iron and aluminum salts from a sample of fertilizer which comprises converting said salts in a solution into hydroxides by ammonium hydroxide and then adding ammonium sulphide and precipitating the sulphides of calcium, lead, iron and aluminum with ammonium oxalate, then removing the precipitate from the solution.

4. A method of removing calcium, lead, iron and aluminum salts from a sample of fertilizer which comprises converting said salts in a solution into hydroxides by ammonium hydroxide and then adding ammonium sulphide and precipitating the sulphides of calcium, lead, and iron and aluminum with ammonium oxalate, then removing the precipitate from the solution, evaporating the filtrated solution to dryness to obtain a potassium salt, re-acting this salt with sulphuric acid to obtain potassium sulphate, re-acting with the sulphate, a few drops of hydrochloric acid and an excess of platinic chloride solution, lixiviating the product with water and alcohol.

EUGENE L. PARKER.